United States Patent [19]

Melby et al.

[11] 4,192,916

[45] * Mar. 11, 1980

[54] PROCESS FOR PRODUCING DEFATTED HEPARIN TISSUE FOR HEPARIN PRODUCTION

[75] Inventors: William E. Melby; Charles E. Isdale, Sr.; Vernon K. Collins, all of Champaign, Ill.

[73] Assignee: A. H. Robins Company, Incorporated, Richmond, Va.

[ * ] Notice: The portion of the term of this patent subsequent to Feb. 12, 1997, has been disclaimed.

[21] Appl. No.: 893,651

[22] Filed: Apr. 5, 1978

Related U.S. Application Data

[63] Continuation-in-part of Ser. No. 743,385, Nov. 19, 1976, abandoned, which is a continuation-in-part of Ser. No. 627,625, Oct. 31, 1975, abandoned.

[51] Int. Cl.$^2$ .................. C12B 1/00; C08B 37/10
[52] U.S. Cl. ................................ 435/274; 435/84; 536/21
[58] Field of Search ............... 195/2, 4, 7; 536/21

[56] References Cited

U.S. PATENT DOCUMENTS

| | | | |
|---|---|---|---|
| 2,410,084 | 10/1946 | Kuizenga | 195/7 |
| 2,539,544 | 1/1951 | Levin et al. | 195/66 R |
| 2,884,358 | 4/1959 | Bush et al. | 195/7 |
| 3,862,003 | 1/1975 | Okuyama et al. | 195/7 |

*Primary Examiner*—Lionel M. Shapiro

[57] ABSTRACT

An improved process for producing defatted heparin tissue is disclosed wherein frozen heparin-bearing tissue is particulated, thawed and warmed in a heat exchanger, fermented at temperatures ranging from about 60°–85° F. for 5 to 12 hours and subjected to azeotropic distillation and extraction to substantially remove water and fat. Putrefaction and odor are avoided, the tissue has improved uniformity in biochemical content, is lower in fat content and is capable of high heparin yields when processed according to known procedures. The defatted tissue is exceptionally permeable to heparin recovery solutions and heparin isolation is facilitated.

11 Claims, No Drawings

PROCESS FOR PRODUCING DEFATTED HEPARIN TISSUE FOR HEPARIN PRODUCTION

BACKGROUND OF THE INVENTION

The present application is a continuation-in-part application of copending application Ser. No. 743,385 filed Nov. 19, 1976, now abandoned which was a continuation-in-part application of copending application Ser. No. 627,625 filed Oct. 31, 1975, now abandoned. Copending application Ser. No. 893,652 filed Apr. 5, 1978, which is a continuation-in-part application of copending application Ser. No. 743,373 filed on Nov. 19, 1976, now abandoned describes a related process which utilizes the first three steps of the process of this invention.

This invention relates to an improved process for producing a defatted heparin tissue and the product therefrom. More particularly, this invention relates to an improved process for producing a defatted heparin tissue wherein prior to desiccating and defatting with an azeotropic solvent, the frozen heparin-bearing animal tissue is tempered under controlled conditions of temperature and time. The tissue is first particulated as by grinding, chopping or other means while in a frozen or partially frozen state, thawed and warmed in a heat exchanger, fermented by the action of endogenous enzymes and bacteria at about 60°–85° F. for 5 to 12 hours but not substantially beyond the time severe foaming and gassing begins and thereafter subjected to the boiling action of an azeotropic solvent to substantially remove tissue water and fat. The desiccated and defatted tissue is especially suited for use in heparin recovery processes.

Heretofore, prior to desiccating and defatting heparin tissues with an azeotropic solvent, frozen heparin-bearing animal tissue was tempered by allowing solidly frozen blocks of the tissue in bags or boxes to gradually thaw and warm up over periods of 2 to 8 days at ambient temperature of 60°–120° F. while in these containers, during which time it had been thought optimal conditioning of the tissue for heparin release in subsequent heparin recovery was occurring. However, the tissue is very sensitive to enzymatic action and subject to decomposition by undesirable bacterial growth and rotting of tissue. The outside of a frozen block of tissue subjected to these older tempering methods could actually putrefy before the interior had reached a thawed state. This resulted in generation of obnoxious undesirable odors which, during the 2–8 day period would spread throughout the community surrounding the tempering plant. This long period of time required for tempering resulted in poor utilization of space with consequent high overhead expense, bloody fluid and sewage disposal problems and tempered tissue which was not sufficiently uniform biochemically from one lot to another due to non-uniform tissue breakdown resulting in heparin unavailability and consequent need for continual adjustment during later processing in heparin isolation. In addition, unwanted bacterial decomposition is known to cause high pyrogen content and increased effort was required for pyrogen removal. Tissues tempered by this prior method which were then subjected to azeotropic processing to desiccate and defat normally contained at least 0.5 weight % fat even under the most favorable circumstances and more generally the fat content ranged from 1.0 to 2.0%. In addition, the defatted-dehydrated tissue particles were difficult to wet and floated for long periods of time in conventional solutions used in the initial step of the heparin recovery process and the mixtures were difficult to handle and filter subsequently in the process. The defatted-dehydrated tissue prepared according to the present invention is of unusual high quality and contains only about 0.1 to 0.2 weight % fat and is readily wetted in the above-described heparin recovery process and mixtures are more easily filtered. Other indications of improved quality of the product of this invention are light color, little odor, good texture, homogeneity and low residual solvent. In addition, more fat is recoverable from the solvent for a given amount of heparin-bearing tissue which is an advantage. Apparently, the novel combination of steps in the present process of particulating frozen tissue, rapidly thawing and warming the tissue, fermenting under controlled conditions and azeotropic processing is responsible for the increased wettability. Further and equally important due to the control of conditions during tempering, the heparin yield obtainable therefrom and content of the defatted tissue of this invention can be as much as about 10–12% higher than for the above-described prior art defatted tissue.

M. H. Kuizenga in U.S. Pat. No. 2,410,084 discloses dispersing animal tissue in at least 15% added water, raising the temperature of the mixture for a short period of time to a first elevated temperature of to 86°–122° F., preferably at least 96° F. and thereafter autolyzing the mixture for conventional time periods; e.g., 24 hr. Putrefaction is inhibited by adding xylene. Total assay units of heparin ranged from 845,000 to 1,032,000 for an average of 850,000 units per 100 lb. of starting tissue.

While the method of the foregoing patent was an improvement over earlier conventional methods described by A. F. Charles and D. A. Scott in Trans. Royal Society of Canada Sec. 5, pp 55–58 (1934), the method of the present invention in which no water and no preservative are added represents an even greater advance in that on average about 50% more assay units of heparin are recovered than were recovered by Kuizenga. In the present invention there is no requirement to heat to a first elevated temperature of 86°–122° F., maximum heparin yields being obtained from tissue fermented at temperatures as low as 70°–75° F., which temperatures did not exceed 70°–75° F. at any time during warm-up and fermentation.

A further important advantage associated with elimination of addition of water is in energy economy in the azeotropic distillation step of the present invention. Each added pound of water requires distillation of eleven pounds of ethylene dichloride (EDC) to remove the added water. The energy requirement to evaporate one pound of water and eleven pounds of EDC is at least 2,540 BTU. Thus, comparing the present process which uses no water to the foregoing prior art method for 100 lb. of starting tissue mixed with 15 lb. of water, the net savings in energy is at least 38,100 BTU.

The process of the present invention also eliminates the expense of adding and recovering xylene. Holding time for fermentation is also greatly reduced resulting in time and space savings.

U.S. Pat. No. 2,954,321 outlines difficulties associated with attempts to control bacterial development of pyrogens and putrefaction with accompanying odor problems. Bacteriostats are said to reduce heparin yield since the bacteria are apparently essential for maximum yields in the autolysis procedure. Attempts to carefully control reaction conditions to control bacterial population during autolysis are said also to reduce heparin yields. The present invention overcomes these problems by eliminating bacteriostat and water which allows free growth of bacteria and shorter fermentation time with less degradation of heparin and by following a strict regimen of temperature and time control in rapid thawing, warming and fermentation. As a result, unexpected superior yields of heparin are obtained.

U.S. Pat. No. 2,539,544 discloses comminution of frozen tissue in a hammermill prior to azeotropic extraction and immediately after grinding, suspending the ground tissue in a solvent. In the present invention the tissue is thawed and warmed by passing it through a heat exchanger and thereafter fermented.

As used herein, the term "tempering" refers to raising the temperature of frozen heparin-bearing animal tissue and conditioning it for further heparin recovery processing. The term "heparin-bearing animal tissue" refers to those animal tissues rich in heparin and suitable for heparin production such as lung, brain, liver, intestines or inexpensive fleshy parts of animals. The term "particulate" or derivatives thereof pertains to the divided state of the tissue; i.e., size up to about ¼ inch mesh, or the act of dividing larger pieces which have been pre-broken or flaked. The term "fermentation" refers to the combined action of endogenous enzymes and endogenous bacteria on the tissue. By "endogenous bacteria" is meant those bacteria present as a normal tissue population and due to multiplication during fermentation. By "endogenous enzymes" is meant enzymes present initially in the tissue and those produced by endogenous bacteria during fermentation.

The term "azeotropic processing" refers to the subjection of the tissue to the boiling action of a solvent which forms an azeotrope with water to substantially remove it and which extracts tissue fat into the solvent stream and thereafter collecting and washing the dehydrated tissue on a filter with solvent.

SUMMARY OF THE INVENTION

The present invention therefore resides principally in the discovery that improved tempering of frozen or partially frozen heparin-bearing animal tissue can be effected by particulating and pumping to a heat exchanger where, under controlled conditions, it is thawed and warmed to obtain tissues which, after fermentation within a specific temperature range of 60°–85° F. for a period of time of 5 to 12 hours to substantially effect enzymatic conditioning of tissue to improve heparin availability and azeotropic processing, are exceptionally low in fat content and exceptionally high in available heparin due to control of time and temperature throughout the processing of each lot and are comparatively low in pyrogen content.

The preferred process comprises grinding frozen or partially frozen tissue and rapidly thawing and warming the thawed tissue in a heat exchanger, fermenting the tissue at about 60° to 85° F. for a period of time to optimize heparin availability. No water in addition to tissue water is required either in thawing or in the fermentation step. No preservative of any kind is added as the growth of favorable bacteria must be promoted during fermentation. No enzymes or bacteria additional to the endogenous enzymes and bacteria are added. The tissue is finally subjected to azeotropic processing to remove moisture and fat. Generally speaking, the higher the temperature within this range during fermentation the shorter will be the time required. For some unexplained reason, severe evolution of gas and foaming signals the end of the desirable fermentation phase.

The heparin in the tissue tempered as in this invention may be recovered by a number of techniques including the methods of U.S. Pat. Nos. 2,797,184 and 2,954,321 with easy wettability and processing advantages being evidenced.

It is, therefore, an object of the present invention, generally stated, to provide an improved process for preparing desiccated and defatted heparin tissue from frozen heparin-bearing animal tissue, particularly wherein the process eliminates the unsanitary conditions of rotting and obnoxious odor which are attendant in prior art methods and wherein more of the fat is extracted.

Another object is to provide an improved desiccated and defatted heparin tissue especially adaptable to heparin recovery because of its ready extractability in heparin recovery.

Another object of the present invention is to provide a process for preparing a desiccated and defatted heparin tissue wherein prior to azeotropic processing, frozen heparin-bearing animal tissue is tempered under controlled conditions as to precise temperature at all times including a controlled fermentation step wherein the endogenous microbiological population is evenly distributed in the substrate and their growth promoted, allowing also the action of endogenous enzymes present to act on the substrate and which produces a uniformly conditioned product having a more consistent biochemical content which is lower in pyrogen content and high in available heparin content and is exceptionally low in fat content.

Certain other and more specific objects will in part become apparent to artisans and will in part appear hereinafter from a more detailed description of the best mode of carrying out the invention and the examples which follow.

DETAILED DESCRIPTION OF THE INVENTION

The preferred process of the present invention for producing desiccated and defatted heparin tissue without added water or preservatives in preparation for isolation and recovery of heparin comprises the steps of (1) particulating the frozen tissue to any size up to about ¼ inch mesh size, preferably ⅛ to ¼ inch mesh size, preferably using a grinder.

(2) thawing and warming the particulated tissue from step 1, in the absence of added water or preservatives, to a temperature within the range of about 60° to 85° F., preferably 70° to 85° F. using a heat exchanger, preferably a shell and tube heat exchanger, (3) causing fermentation of the warmed tissue in the absence of added water or preservatives from step 2 by spontaneous action of enzymes and bacteria endogenous to the tissue, no additional enzymes or bacteria being required, by holding it at a temperature within the range of about 60° to 85° F. for a period of 5 to 12 hours, preferably 70° to 85° F. for a period of 6 to 8 hours time but not substantially beyond the time foaming starts due to gas liberation, and (4) subjecting the fermented tissue from step 3 to azetropic-distillation processing with a suitable solvent, preferably ethylene dichloride, to substantially dehydrate and defat the fermented tissue.

The heparin-bearing animal tissue for the process of this invention originates at the meat packing plant where it is cut from animal carcasses and handled according to specified procedures for preserving and enhancing heparin values, boxed or bagged and deep frozen. As a consequence, the animal parts arrive at the heparin recovery plant as blocks of one kind of frozen, agglomerated animal part such as, for example, lung in the size and shape of the containers. Usually, the size of the blocks of frozen animal parts is too large for direct particulation in the size equipment feasible for this art and it is therefore necessary to reduce the size of the blocks by some prior means. To accomplish this, the deep frozen blocks of tissue may be cracked or prebroken mechanically by some means. Preferably, however, the blocks of deep frozen tissue are partially defrosted for about 8 hours at ambient temperatures of 80°–100° F. and thereby brought from their deep-frozen state to a softer state by raising the temperature of the blocks to about 20°–32° F. after which time the soft-frozen tissue may be chipped or flaked in preparation for particulation. When the flaking or chipping procedures are followed, the preferable temperature to which the blocks of tissue are raised is about 26° F. as the tissue is rigid enough to be flaked, yet in a somewhat softened condition feasible for the flaking operation. A suitable flaking machine is the Hydrauflaker TM produced by the General Machinery Corp., Sheboygan, Wis. In any case, the tissue should not be so cold that the particulated tissue in the next step refreezes into balls and clumps which prevent pumping. In general, the particle size of prebroken or flaked tissue can vary from ⅛ inch to 2 inches.

In step 1 of the process, grinders operate to reduce the size of the prebroken or flaked, frozen, or partially frozen tissue to that ranging from that present in a puree up to a maximum dimensional mesh size of about 1¾ inch, preferably up to a mesh size of ⅛ inch. No water is added. Grinders which are suitable are the Comitrol TM produced by Urschel Laboratories of Valparaiso, Ind. and the Autio TM grinder produced by the Autio Company, Astoria, Oreg.

In step 2, the ground frozen or partially frozen tissue is introduced by means of a pump such as a Moyno TM pump to a heat exchanger which operates to thaw and warm the tissue in 30 minutes or less, preferably within about 8 minutes, to about 60° to 85° F. using a heat exchange surface temperature not to exceed 140° F. No water is added. Above about 30 minutes, too much variation is introduced in later processing. Heat exchange surfaces having a higher temperature than 140° F. cause fouling of the surfaces, denaturing of protein and microbiological kill-off. Shell and tube heat exchangers with tissue passing through the tube are highly satisfactory and preferred but wiped surface exchangers may be also used. The preferred shell and tube heat exchangers will range in tube size of about ¾ inch diameter to about one inch in diameter and will consequently have surface to volume ratios of about 50 to 75 ft.$^2$ per ft.$^3$ Surface of tubes in this size range remain unfouled at normal pumping velocities. Alternately, the tissue may be thawed and warmed partially in the heat exchanger and then warmed to 60°–85° F. by other means, total thawing and warming time not exceeding 30 minutes.

In step 3, the warm tissue having no added water or preservatives and no added enzymes or bacteria is held in a vessel having an inert surface as a stainless steel tank at a temperature of about 60° to 85° F., preferably 70° to 85° F., for a period of time sufficient to condition the heparin tissues as a result of a fermentation involving enzymes already present and enzymes produced by growing endogenous microorganisms. Above 85° F. heparin values are rapidly lost due to growth of thermophylic bacteria and the fermentation is more difficult to control due to variations in speed of growth of desirable bacteria and the possible overgrowth of the more thermophylic bacteria. Additionally, when the tissue is fermented above 85° F. pumping of fermented tissue from the fermentation vessel to azeotropic distillation step becomes extremely difficult in short periods of time due to gas development. Below about 60° F. undesirable microorganisms such as molds may grow and which have a deleterious effect as well as giving unpredictable heparin yield in further processing. Five to 12 hours fermentation time is required at 60° to 85° F. and for some unknown reason the completion of the beneficial fermentation is signaled by severe gas liberation and rising in the holding tanks and further fermentation decreases the yield of heparin. The holding period should be terminated then or just preceding this indicator according to previous experience as to time requirement for a particular temperature. Illustrative of the time temperature relationship are the following coordinates obtained by trial and error at which the gassing phase had begun.

| Time, hr. | Temp., °F. |
| --- | --- |
| 11–12 | 60 |
| 9–10 | 75 |
| 8 | 80 |
| 6 | 85 |
| 4 | 90 |

It is not necessary to wait until gassing occurs to obtain the superior product of this invention. Generally, there is some variation of microorganisms in lung tissue among individual animals; however, grinding and mixing of many lung lobes assures that the bacterial population will be such that fermentation will eventually proceed.

In step 4, the fermented tissue from step 3 is subjected to azeotropic processing procedures such as are disclosed in U.S. Pat. Nos. 2,619,425 and 2,539,544. Preferably, the azeotropic processing is conducted at atmospheric pressure using ethylene dichloride at a temperature not exceeding 180° F. However, other solvents such as propylene dichloride, trichloroethylene, hexane and the like may be used. Endogenous enzymes and bacteria are deactivated by the organic solvent during azeotropic distillation.

Defatted heparin tissue obtained by the foregoing process is characterized by its low fat content of about 0.1 to 0.3% and by its excellent permeability as measured by wettability and suspendability.

The following are specific examples of the process of this invention. Heparin recovery was done by a modified but comparable procedure of U.S. Pat. No. 2,410,084. Units of heparin are USP units.

Example 1

Partially defrosted frozen beef lung at 25°–30° F. in amount of 15,190 lbs. was flaked using a Hydrauflaker TM (Model FS-6) to a size range of ⅛ inch to ¼ inch thick and up to 4 inches long. The flaked frozen lung was then ground with a Comitrol TM grinder (Model 2100) having 0.06 inch size openings. The ground frozen or partially frozen lung was pumped with a Moyno TM pump through ¾ inch diameter tubes of a shell and tube heat exchanger to thaw and warm the lung to 68°–73° F., residence time in the heat exchanger being about 4 minutes. The warm ground lung was then held in a stainless steel tank for 6 hours at 70°–75° F. No external heat was needed to maintain the temperature during the fermentation and a slight rise in temperature due to heat of reaction was also noted, but the temperature did not exceed 75° F. at any time. The tissue was then subjected to boiling action at atmospheric pressure of ethylene dichloride until water had been substantially removed. The dehydrated tissue was then collected on a filter and washed once with redistilled ethylene dichloride. Residual solvent was removed by conventional desoventizing methods. There was obtained 2,804 lbs. of desiccated and defatted tissue containing 0.18% and 1.6% moisture. Processing of the desiccated and defatted tissue to recover heparin yielded $158 \times 10^3$ units heparin/kg. of desiccated and defatted lung. Heparin potency was 79 units per milligram.

Example 2

Partially defrosted frozen beef lung at 26° F. in amount of 16,200 lbs. was flaked and ground as in Example 1, using 0.120 inch size openings on the grinder. The ground lung was thawed and warmed to 83° F. in a heat exchanger as in Example 1, residence time being about 4 minutes. The warm ground lung was then held in a stainless steel tank for 6 hours at 83°–85° F. No undesirable odor was present at any time. There was obtained 15,800 lbs. of tempered lung. The tissue was then subjected to boiling action of ethylene dichloride at atmospheric pressure until water had been substantially removed. The defatted-dehydrated tissue was then collected on a suction filter and washed once with pure ethylene dichloride. Residual ethylene dichloride was removed by conventional desolventizing techniques. There was obtained 2816 lb. of defatted tissue containing 0.3 weight % fat and 2.2 weight % moisture. Processing of the defatted tissue to recover heparin yielded $152.7 \times 10^3$ units heparin per kg. of defatted-dehydrated tissue. Heparin potency was 58.8 units/mg.

Example 3

Frozen beef lung (12,000 lb.) was ground as in Example 1, thawed and warmed to 40°–50° F., residence time being about 2 minutes in the heat exchanger. The ground lung was then held at 40°–50° F. for 6 hours. There was obtained about 11,900 lbs. of tempered beef lung tissue. The tissue was then subjected to azeotropic extraction with ethylene dichloride as in Example 1. After removel of solvent there was obtained 2,046 lb. of defatted-dehydrated tissue containing 0.12 weight % fat and 2.6 weight % moisture. Processing of the defatted tissue to recover heparin yielded $164 \times 10^3$ units heparin per kg. of defatted-dehydrated tissue. Heparin potency was 48 units/mg.

Example 4

Frozen beef lung (12,000 lb.) was ground as in Example 1, thawed and warmed to 90°–110° F. in the heat exchanger, residence time being about 6 minutes. The ground lung was held at 90°–110° F. for 6 hours. There was obtained about 11,900 lbs. of tempered beef lung. The tissue was subjected to azeotropic extraction with ethylene dichloride as in Example 1. After removal of solvent, there was obtained 1751 lbs. of defatted-dehydrated tissue containing 0.08 weight % fat and 1.2 weight % moisture. Processing of the defatted tissue to recover heparin yielded $86 \times 10^3$ units heparin per kg. of defatted-dehydrated tissue. Heparin potency was 74 units/mg.

Example 5

Frozen beef lung (16,200 lbs.) was ground, thawed and warmed as in Example 1 to 79° F., residence time in the heat exchanger being about 3 minutes. The warm ground lung was then held in a stainless steel tank for 8 hours at 79°–80° F. No undesirable odor was present at any time. There was obtained 15,850 lb. of tempered beef lung. The tissue was then subjected to boiling action of ethylene dichloride at atmospheric pressure until water had been substantially removed. The defatted-dehydrated tissue was then collected on a filter and washed once with ethylene dichloride. Residual ethylene dichloride was removed by conventional desolventizing techniques. There was obtained 2850 lb. of defatted tissue containing <0.2 weight % fat and 2.2 weight % moisture. Processing of the defatted tissue to recover heparin yielded $155 \times 10^3$ units heparin per kg. of defatted-dehydrated tissue. Heparin potency was 96 units/mg.

Data for the foregoing examples are summarized in Table I for comparison.

Table 1

| | Lung Fermentation, Extraction and Heparin Isolation | | | | |
|---|---|---|---|---|---|
| Ex. No. | Fermentation Conditions | | % Yield of Dried Defatted Lung (DDF) (a) | % Fat in Dried Defatted Lung (DDF) | Crude Heparin Yield (b) | Heparin Potency (c) |
| | Temp. °F. | Time, hr. | | | | |
| 1 | 70–75 | 6 | 18.4 | 0.18 | 158 | 79 |
| 2 | 85 | 6 | 17.4 | 0.30 | 153 | 59 |
| 3 | 40–50 | 6 | 17.1 | 0.12 | 164 | 48 |
| 4 | 90–110 | 6 | 13.9 | 0.08 | 86 | 74 |
| 5 | 80 | 8 | 18.0 | <0.2 | 155 | 96 |

(a) Wt. % based on starting lung.
(b) Units heparin × $10^3$/kg. desiccated and defatted lung.
(c) Units heparin/mg. in crude heparin.

Total assay units of heparin made available within the scope of the process of the present invention per 100 lb. starting lung as exemplified are given in Table 2 and are determined by calculation from the data of Table 1 as illustrated for Example 1 as follows:

Units heparin per 100 lb. = 18.4 lb. × 0.45359 kg/lb.* ×

-continued

| | |
|---|---|
| Starting Raw Lung | 150 × 10³ units/kg. = 1,319,000 units heparin. |

*Conversion factor kg. per lb.

Table 2

| Example | Total Units per 100 lb. Starting Lung |
|---|---|
| 1 | 1,319,000 |
| 2 | 1,204,000 |
| 5 | 1,237,000 |
| | 1,253,000 Avg. |

In comparison, the assay units of heparin obtained by Kuizenga in U.S. Pat. No. 2,410,084, which processing was conducted with water and preservative, average 850,000 units per 100 lb. starting lung. See also J. Biol. Chem. 148: 641-7(1943) wherein the foregoing average is given on page 646. Thus, the availability of heparin demonstrated in the examples of the present invention is an average approximately 50% greater than obtained by Kuizenga and approximately 3.5 times that reported by Charles & Scott, Tr. Roy. Soc. Canada, Sec. 5, 28, 55(1934).

COMPARISION OF WETTABILITY OF TEMPERED - DEFATTED TISSUE

Comparision was made of wettability of azeotropically defatted tissue prepared by the new improved process of this invention with that of the defatted tissue prepared from tissue tempered by the old method, wherein the lung was tempered about 4 days at ambient temperature of 80°-100° F. and no water having been added. For this comparision, a 20 gram sample of the defatted product was stirred in 200 ml. water until the particles appeared wet on the outside and the stirring stopped. The time required for the bulk of the particles to sink was then recorded. Data are in Table 3.

Table 3

| Wettability Comparison | |
|---|---|
| Method of Tempering | Time For Particles to Sink to Bottom Seconds |
| Old | >180 |
| New | < 10 |

What is claimed is:

1. A process for producing a defatted heparin tissue from frozen heparin-bearing animal lung tissue without addition of water, preservatives or enzymes in preparation for isolation of heparin and to maximize heparin availability which comprises the steps of
   (1) particulating the frozen tissue,
   (2) thawing the particulated tissue from step 1 in a heat exchanger and warming said tissue without added water or preservative to 60°-85° F. within 2 to 30 minutes using heat exchanger surfaces which do not exceed 140° F.,
   (3) fermenting the warmed tissue from step 2 without added water or preservatives by spontaneous action of enzymes and bacteria endogenous to the tissue, no additonal enzymes or bacteria being added, by holding said tissue at a controlled temperature of 60°-85° F. for a period of time of 5-12 hours to substantially effect conditioning of said tissue to improve heparin availability, endogenous bacteria being allowed to grow without inhibition during said period of time, and
   (4) subjecting the fermented tissue from step 3 to azeotropic distillation processing with a suitable solvent to substantially dehydrate and defat said fermented tissue.

2. A process of claim 1 wherein the heparin-bearing tissue is beef lung.

3. A process of claim 1 wherein in step 2 the tissue is thawed and warmed to said temperature in 2 to 8 minutes.

4. A process of claim 1 wherein in step 2 the heat exchanger is a shell and tube heat exchanger, said tissue being moved through the tube.

5. A process of claim 1 wherein in step 3 the organic solvent is ethylene dichloride.

6. A process of claim 1 wherein as a result of step 1 the tissue is in a flaked condition.

7. A process of claim 1 wherein in step 2 the tissue is warmed to 70°-85° F. and in step 3 the tissue is held at a temperature of 70°-85° F. for 6 to 8 hours.

8. A process for producing a defatted heparin tissue from lung tissue without addition of water, preservatives or enzymes in preparation for isolation of heparin and to maximize heparin availablity which comprises the steps of
   (1) particulating the frozen tissue,
   (2) thawing the particulated tissue in a heat exchanger and warming said tissue, without added water or preservatives, to 70° to 85° F. within 2 to about 8 minutes time using heat exchanger surface temperatures which do not exceed 140° F.,
   (3) fermenting the warmed tissue from step 2 without added water or preservatives, by spontaneous action of enzymes and bacteria endogenous to beef lung tissue, no additional enzymes or bacteria being added, by holding said tissue at a controlled temperature of 70° to 85° F. for a period of time of 6 to 8 hours to substantially effect conditioning of said tissue to improve heparin availability, endogenous bacteria being allowed to grow without inhibition during said period of time, and
   (4) subjecting the fermented tissue from step 3 to azeotropic-distillation processing with a suitable solvent to substantially dehydrate and defat said fermented tissue.

9. A process of claim 8 wherein in step 2 the heat exchanger is in a shell and tube heat exchanger, said tissue being moved through the tube.

10. A process of claim 8 wherein in step 3 the organic solvent is ethylene dichloride.

11. A process of claim 8 wherein as a result of step 1, the tissue fermented is in a flaked condition.

* * * * *